Aug. 25, 1925.

E. EDWARDSON

VEHICLE SPRING

Filed June 9, 1922      2 Sheets-Sheet 1

1,551,473

Edward Edwardson
INVENTOR

BY Victor J. Evans
ATTORNEY

WITNESS:

Aug. 25, 1925.
E. EDWARDSON
VEHICLE SPRING
Filed June 9, 1922    2 Sheets-Sheet 2
1,551,473
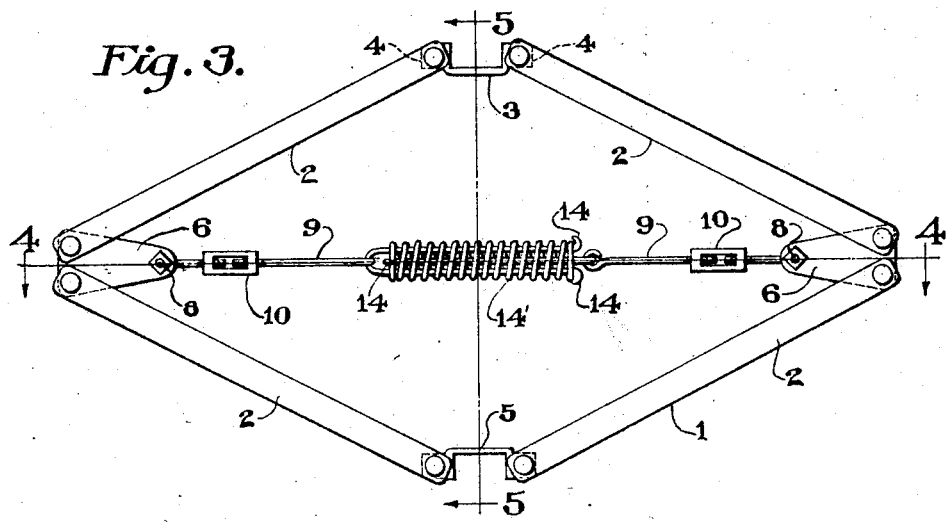
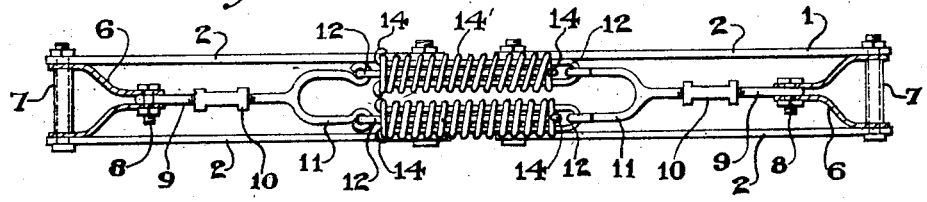
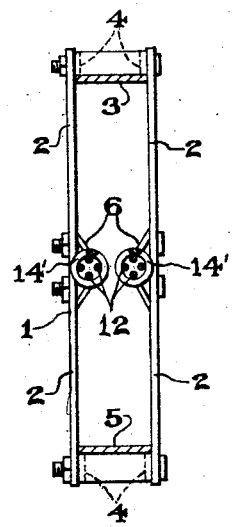
Edward Edwardson, INVENTOR
BY *Victor J. Evans*
ATTORNEY
WITNESS:

Patented Aug. 25, 1925.

1,551,473

UNITED STATES PATENT OFFICE.

EDWARD EDWARDSON, OF HYDER, TERRITORY OF ALASKA.

VEHICLE SPRING.

Application filed June 9, 1922. Serial No. 567,134.

*To all whom it may concern:*

Be it known that I, EDWARD EDWARDSON, a citizen of Norway, residing at Hyder, Territory of Alaska, have invented new and useful Improvements in Vehicle Springs, of which the following is a specification.

This invention relates to springs for vehicles, the general object of the invention being to provide a plurality of toggle lever frames with springs for holding the frames in expanded position.

Another object of the invention is to provide means for adjusting the tension of the spring means.

A further object of the invention is to provide braces for strengthening the construction.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figures 3, 4 and 5 are detail views.

Figure 1:
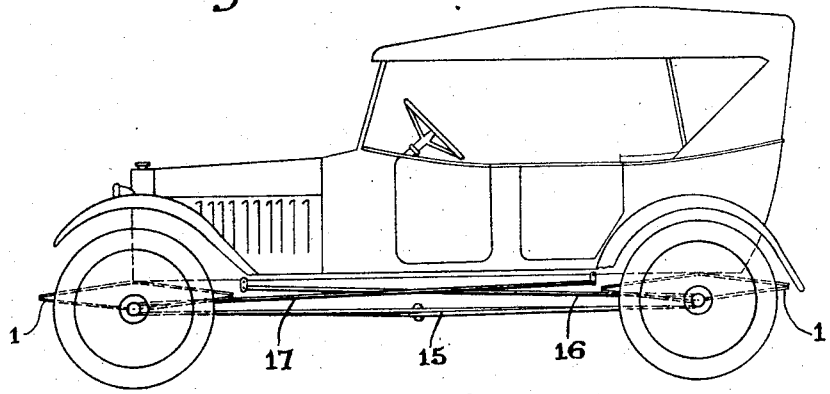
Figure 1 is a side view of an automobile provided with my invention.
Figure 2:
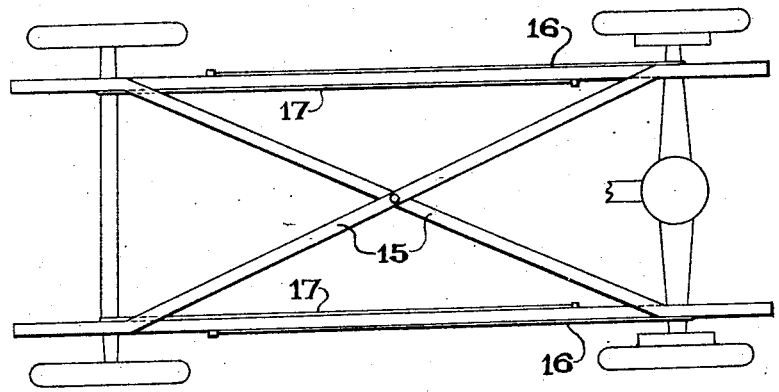
Figure 2 is a plan view of the chassis of the automobile.

In these views 1 indicates a toggle lever frame which is placed adjacent each wheel of the vehicle. Each frame consists of four pairs of bars 2, the bars of each pair being arranged in parallel relation. The inner ends of the two upper pairs are pivotally connected with bolts to a channel plate 3, the plate being provided with ears 4 through which the bolts pass. The two lower pairs are similarly attached to a channel plate 5. The ears of the plates engage the inner faces of the bars so that said bars are spaced apart the length of the plate. The outer ends of the bars are pivotally secured to the two pairs of converging plates 6, one pair of the plates 6 being connected with the outer ends of the upper and lower bars at one end of the frame and the second pair of plates 6 being connected with the outer ends of the opposite bars. Spacing sleeves 7 are placed between the plates of each pair and through which the bolts pass so as to space the plates of each pair apart. The inner ends of each pair of plates 6 are connected together by a bolt 8 and a rod 9 has its eye engaging each plate, the eye being arranged between the plates 6. A turn-buckle 10 is threaded on each rod and a forked member 11 has its stem threaded to each turn buckle. Each prong of each fork member is connected with the bight of a U-shaped member 12, the U-shaped member carried by one prong being arranged in proximity to the U-shaped member which is carried by the opposite prong of the other forked member. The ends of each U-shaped member are bent over into hook form, as shown at 14, and a spring 14' is placed on each pair of U-shaped members with its ends engaging the hooks. Thus these springs will tend to prevent the U-shaped members from being drawn apart and so act to keep the toggle frame in expanded position.

The lower plate 3 is secured to the axle in any desired manner and the upper plate 5 to the body of the vehicle. Three braces are arranged at each side of the vehicle, the brace 15 connecting the axles together and the brace 16 having one end connected with the rear axle and its other end to the under part of the body adjacent the front end and the brace 17 having one end connected with the front axle and its upper end connected with the body adjacent the rear end thereof. The braces 15 are stationary braces while the other braces are sway.

From the above it will be seen that the springs will act to keep the toggle frames in expanded position and thus resist the tendency of the weight of the body to collapse the frames. As the frames are being pressed downwardly the springs will gradually lose their tension so that the spring device will not turn on the recoil as fast as the ordinary loose springs will. This will insure easy riding of the vehicle and will render the use of shock absorbers unnecessary.

It will be apparent from the foregoing that the important feature of my invention resides in the U-shaped elements 11 which lend themselves to the maintenance of longitudinal spring devices in spaced and parallel relation so that each of said devices is prevented from interfering with the operation of the other, and also lend themselves to the connection of the longitudinal parallel devices to longitudinal alined rods, which, in turn, are connected with the outer ends of pairs of links which normally define a parallelogram. By virtue of the said U-shaped elements 11 strong connections are effected between the ends of the two spring devices and single rods 9 arranged longitudinally at opposite sides of the two spring devices whereby each spring device is enabled to exert an even pull on the rods.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a spring device, spaced and parallel links arranged in pairs to normally define a parallelogram, a plate interposed between and connected to the inner ends of the upper links, a plate interposed between and connected to the inner ends of the lower links, links arranged between and pivotally connected to the outer ends of the first-named links, longitudinal rods pivotally connected to the inner ends of the second-named links and having opposite U-shaped elements at their inner ends, and longitudinal spring devices arranged in spaced and parallel relation and interposed longitudinally between and connected to the longitudinally opposite arms of the U-shaped elements.

2. In a vehicle spring device, pairs of normally divergent links arranged to normally define a parallelogram, elements to which the inner ends of the links are pivoted, normally alined longitudinal rods, swingable means interposed between and connecting the outer ends of the links and the outer ends of said rods, U-shaped elements carried on the inner portions of said longitudinal rods, and longitudinal spring devices arranged in parallel and spaced relation and interposed between and yieldingly connecting the longitudinally-opposite arms of the two U-shaped elements.

In testimony whereof I affix my signature.

EDWARD EDWARDSON.